(12) United States Patent
Nagata et al.

(10) Patent No.: US 12,482,115 B2
(45) Date of Patent: Nov. 25, 2025

(54) MOVING BODY TRACKING SYSTEM, MOVING BODY TRACKING DEVICE, NON-TRANSITORY COMPUTER-READABLE MEDIUM, AND MOVING BODY TRACKING METHOD

(71) Applicant: Mitsubishi Electric Corporation, Tokyo (JP)

(72) Inventors: Ayako Nagata, Tokyo (JP); Masahide Koike, Tokyo (JP); Susumu Iino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 417 days.

(21) Appl. No.: 18/014,341

(22) PCT Filed: Aug. 4, 2020

(86) PCT No.: PCT/JP2020/029739
§ 371 (c)(1),
(2) Date: Jan. 4, 2023

(87) PCT Pub. No.: WO2022/029860
PCT Pub. Date: Feb. 10, 2022

(65) Prior Publication Data
US 2023/0260139 A1  Aug. 17, 2023

(51) Int. Cl.
*G06T 7/292* (2017.01)
*G06V 10/44* (2022.01)
(Continued)

(52) U.S. Cl.
CPC .............. *G06T 7/292* (2017.01); *G06V 10/44* (2022.01); *G06V 10/761* (2022.01); *G06V 20/52* (2022.01)

(58) Field of Classification Search
CPC ....... G06T 7/292; G06V 20/52; H04N 23/651
See application file for complete search history.

(56) References Cited

U.S. PATENT DOCUMENTS

| 8,020,672 B2 * | 9/2011 | Lin | B66B 1/34 |
| | | | 187/316 |
| 2012/0020518 A1 * | 1/2012 | Taguchi | G06T 7/292 |
| | | | 382/103 |

(Continued)

FOREIGN PATENT DOCUMENTS

| CN | 108367886 A | * | 8/2018 | ............. B66B 13/14 |
| CN | 108698788 A | * | 10/2018 | ............... B66B 1/28 |

(Continued)

OTHER PUBLICATIONS

International Search Report and Written Opinion mailed on Oct. 20, 2020, received for PCT Application PCT/JP2020/029739, filed on Aug. 4, 2020, 8 pages including English Translation.

Primary Examiner — Michael Robert Cammarata
(74) Attorney, Agent, or Firm — XSENSUS LLP

(57) ABSTRACT

A moving body tracking system includes: a selecting unit (138) that select a target camera from a plurality of cameras disposed in a monitored area; a moving body detecting device (120) that extracts features of a moving body detected in an image captured by the target camera; a comparing unit (139) that compares the extracted features with the features of a tracking target moving body, to identify the tracking target moving body; a tracking managing unit (140) that tracks the movement of the tracking target moving body in the monitored area based on the position of the target camera and the time at which the image including the moving body was captured; and an elevator information acquiring unit (137) that acquires elevator operation information indicating an operation status of an elevator from an elevator system. When the tracked moving (Continued)

object boards an elevator, a selecting unit (138) refers to the elevator operation information to specify a target floor that is a floor on which the tracking target moving body is likely to unboard the elevator and selects at least one camera disposed on the target floor out of the plurality of cameras as the target camera.

19 Claims, 9 Drawing Sheets

(51) Int. Cl.
  *G06V 10/74* (2022.01)
  *G06V 20/52* (2022.01)

(56) References Cited

U.S. PATENT DOCUMENTS

| | | | | |
|---|---|---|---|---|
| 2013/0182905 | A1* | 7/2013 | Myers | A61B 5/1113 |
| | | | | 382/103 |
| 2016/0004390 | A1* | 1/2016 | Laska | H04N 7/186 |
| | | | | 715/723 |
| 2017/0169312 | A1* | 6/2017 | Okumura | G06F 18/22 |
| 2017/0353699 | A1* | 12/2017 | Wang | G08B 13/19695 |
| 2018/0265333 | A1* | 9/2018 | Schuster | B66B 1/3476 |
| 2019/0311201 | A1* | 10/2019 | Selinger | G08B 25/006 |
| 2020/0130983 | A1* | 4/2020 | Karve | B66B 1/2458 |
| 2021/0029298 | A1* | 1/2021 | Mysore | H04N 23/66 |
| 2021/0130124 | A1* | 5/2021 | Liu | G06V 40/10 |
| 2023/0028432 | A1* | 1/2023 | Izawa | B66B 1/52 |

FOREIGN PATENT DOCUMENTS

| | | | | |
|---|---|---|---|---|
| DE | 102018213573 A1 * | 2/2020 | | B66B 3/002 |
| JP | 2006107187 A * | 4/2006 | | |
| JP | 4759988 B2 | 8/2011 | | |
| JP | 2014172715 A * | 9/2014 | | |
| JP | 2016026355 A * | 2/2016 | | B66B 3/006 |
| JP | 2017052578 A * | 3/2017 | | |
| JP | 2018523234 A * | 8/2018 | | |
| JP | 2019-96179 A | 6/2019 | | |
| JP | 2019-114213 A | 7/2019 | | |
| JP | 2020019611 A * | 2/2020 | | B66B 1/2433 |
| WO | WO-2010098024 A1 * | 9/2010 | | G06T 7/292 |
| WO | WO-2016135114 A1 * | 9/2016 | | B66B 1/3476 |
| WO | WO-2017145577 A1 * | 8/2017 | | H04N 21/433 |
| WO | WO-2019087241 A1 * | 5/2019 | | B66B 1/14 |
| WO | WO-2019087251 A1 * | 5/2019 | | B66B 11/02 |
| WO | WO-2020235060 A1 * | 11/2020 | | |
| WO | WO-2021029086 A1 * | 2/2021 | | |

* cited by examiner

MOVING BODY TRACKING SYSTEM, MOVING BODY TRACKING DEVICE, NON-TRANSITORY COMPUTER-READABLE MEDIUM, AND MOVING BODY TRACKING METHOD

CROSS-REFERENCE TO RELATED APPLICATION

The present application is based on PCT filing PCT/JP2020/029739, filed Aug. 4, 2020, the entire contents of which are incorporated herein by reference.

TECHNICAL FIELD

The disclosure relates to a moving body tracking system, a moving body tracking device, non-transitory computer-readable medium, and a moving body tracking method.

BACKGROUND ART

In recent years, there has been known a moving body tracking system, which is a system for automatically detecting and tracking a suspicious person or the like in images captured by cameras by using image recognition technology in order to improve security and reduce the workload on guards in a building.

A conventional moving body tracking system, which tracks a moving body with multiple cameras, extracts the moving bodies and their features captured by the respective cameras and compares the features to determine whether or not the moving bodies are identical.

If all features extracted from the images captured by all cameras in the building are compared in an identification process, the number of targets to be compared increases and may cause a reduction in the identification accuracy. In particular, when multiple moving bodies having similar features are present in the building, it becomes difficult to distinguish between these moving bodies, and misidentification may occur.

A conventional system has been known that calculates the movement paths of moving bodies and performs an identification process for the moving bodies and their features detected in the images captured by the cameras installed on the paths, to improve the tracking accuracy (for example, refer to Patent Literature 1). In such a system, a movement path is calculated by using the moving direction and speed information of the moving bodies captured by the cameras, and an identification process is performed for the moving bodies captured in the images taken by the cameras installed on the calculated movement path. The estimated time of arrival at each camera is calculated from the moving speed, and the search time is reduced, to improve the identification accuracy.

PRIOR ART REFERENCE

Patent Reference

Patent Literature 1: Japanese Patent No. 4759988

SUMMARY OF THE INVENTION

Problem to be Solved by the Invention

When a conventional system is used, it is important to increase the accuracy of predicting the movement path of each moving body. Since the movement path is predicted by using the moving direction and speed information of the moving bodies captured in the images, the accuracy of predicting the movement path can be sufficiently improved by installing cameras in the monitored area without any blind spots.

However, in consideration of the movement of the moving bodies between floors, in many cases, cameras linked with a monitoring system are not installed in the elevators, which are the transportation means between the floors. Therefore, if the target being tracked boards an elevator, it is difficult to know which floor the target unboarded the elevator on, and thus, it becomes difficult to predict the movement path. As a result, misidentification occurs when there are moving bodies having similar features in the same monitored area, and the tracking of the target becomes difficult.

Accordingly, it is an object of one or more aspects of the disclosure to enable tracking of a target even when the target boards an elevator.

Means of Solving the Problem

A moving body tracking system according to an aspect of the disclosure is configured to track movement of a tracking target moving body in a monitored area in which a plurality of moving bodies moves, the tracking body moving body being a target of tracking, the system including: a selecting unit configured to select at least one camera of the plurality of cameras disposed in the monitored area as a target camera; a detecting/extracting unit configured to detect a moving body in an image captured by the target camera and extract a feature of the detected moving body; a comparing unit configured to compare a target feature and a feature of the tracking target moving body to identify the tracking target moving body in the plurality of moving bodies, the target feature being the extracted feature; a tracking managing unit configured to track the movement of the tracking target moving body in the monitored area based on a position of the target camera and a time at which the image including the moving body identified to be the tracking target moving body is captured; and an elevator information acquiring unit configured to acquire elevator operation information indicating an operation status of an elevator installed in the monitored area from an elevator system controlling operation of the elevator, wherein the selecting unit refers to the elevator operation information when the tracking target moving body boards the elevator, to specify a floor on which the tracking target moving body is likely to unboard as a target floor and selects at least one camera disposed on the target floor out of the plurality of cameras as the target camera.

A moving body tracking device according to an aspect of the disclosure is configured to track movement of a tracking target moving body in a monitored area in which a plurality of moving bodies moves, the tracking target moving body being a target to be tracked, the device including: a selecting unit configured to select at least one camera of the plurality of cameras disposed in the monitored area as a target camera; a comparing unit configured to compare a target feature extracted as a feature of a moving body detected in an image captured by the target camera with a feature of the tracking target moving body, to identify the tracking target moving body in the plurality of moving bodies; a tracking managing unit configured to track the movement of the tracking target moving body in the monitored area based on a position of the target camera and a time at which the image including the moving body identified to be the tracking target moving body is captured; and an elevator information acquiring unit configured to acquire elevator operation information indicating an operation status of an elevator installed in the monitored area from an elevator system controlling operation of the elevator, wherein the selecting unit refers to the elevator operation information when the tracking target moving body boards the elevator, to specify a floor on which the tracking target moving body is likely to unboard as a target floor and selects at least one camera disposed on the target floor out of the plurality of cameras as the target camera.

A program according to an aspect of the disclosure causes a computer to function as a moving body tracking device configured to track movement of a tracking target moving body in a monitored area in which a plurality of moving bodies moves, the tracking target moving body being a target to be tracked, the program further causing the computer to function as: a selecting unit configured to select at least one camera of a plurality of cameras disposed in the monitored area as a target camera; a comparing unit configured to compare a target feature extracted as a feature of a moving body detected in an image captured by the target camera with a feature of the tracking target moving body, to identify the tracking target moving body in the plurality of moving bodies; a tracking managing unit configured to track the movement of the tracking target moving body in the monitored area based on a position of the target camera and a time at which the image including the moving body identified to be the tracking target moving body is captured; and an elevator information acquiring unit configured to acquire elevator operation information indicating an operation status of an elevator installed in the monitored area from an elevator system controlling operation of the elevator, wherein the selecting unit refers to the elevator operation information when the tracking target moving body boards the elevator, to specify a floor on which the tracking target moving body is likely to unboard as a target floor and selects at least one camera disposed on the target floor out of the plurality of cameras as the target camera.

A moving body tracking method according to an aspect of the disclosure for tracking movement of a tracking target moving body, which is a target to be tracked, in a monitored area in which a plurality of moving bodies moves, includes: selecting at least one camera of a plurality of cameras disposed in the monitored area as a target camera; detecting a moving body in an image captured by the target camera; extracting a feature of the detected moving body; comparing a target feature and a feature of the tracking target moving body to identify the tracking target moving body in the plurality of moving bodies, the target feature being the extracted feature; tracking the movement of the tracking target moving body in the monitored area based on a position of the target camera and a time at which the image including the moving body identified to be the tracking target moving body is captured; acquiring elevator operation information indicating an operation status of an elevator installed in the monitored area from an elevator system controlling operation of the elevator; referring to the elevator operation information when the tracking target moving body boards the elevator, to specify a floor on which the tracking target moving body is likely to unboard as a target floor, out of the plurality of cameras; and selecting at least one camera disposed on the target floor out of the plurality of cameras as the target camera.

Effects of the Invention

According to one or more aspects of the disclosure, a target can be tracked even when the target boards an elevator.

MODE FOR CARRYING OUT THE INVENTION

First Embodiment

Figure 1:
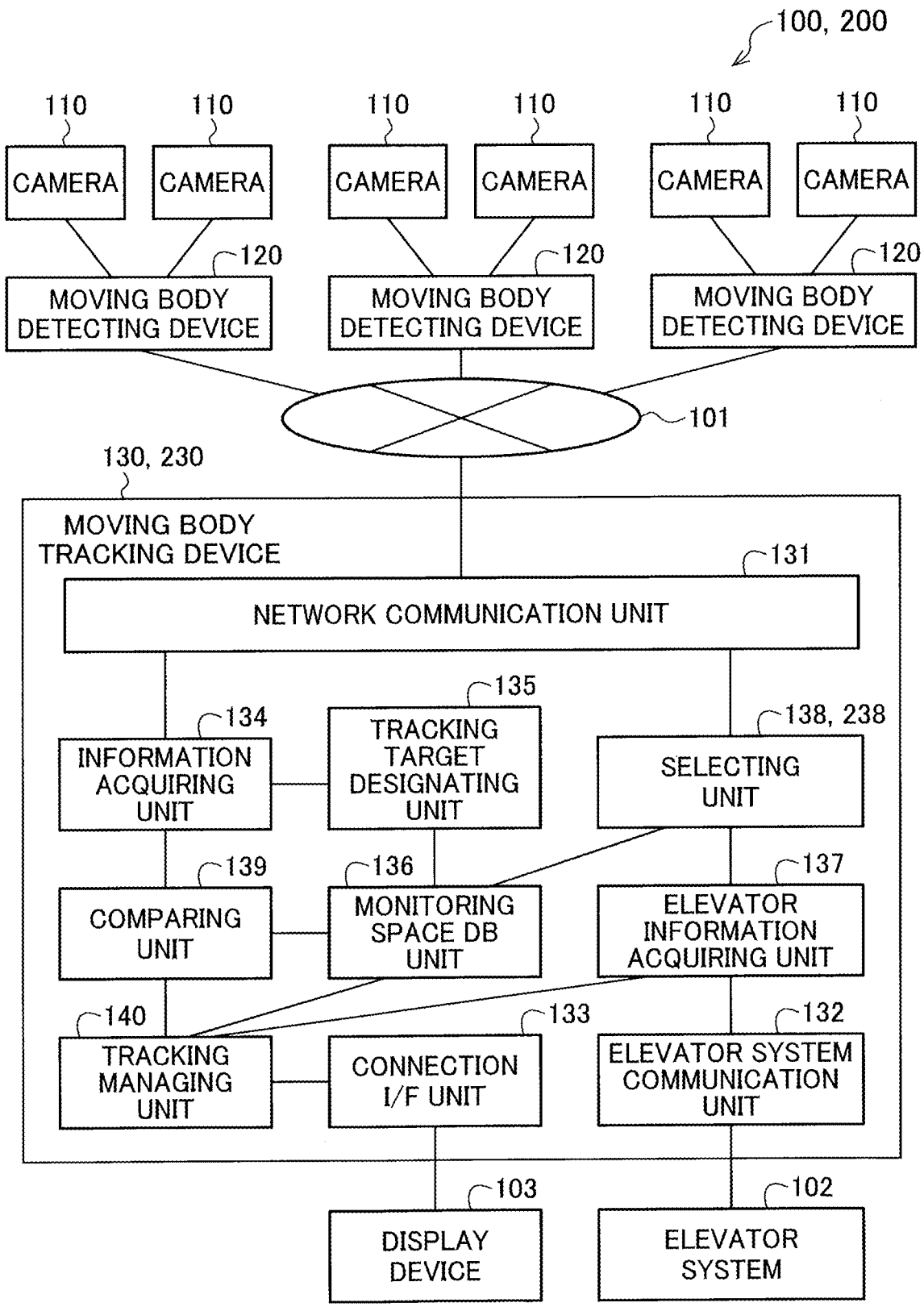
FIG. 1 is a block diagram schematically illustrating the configuration of a moving body tracking system according to first and second embodiments.

FIG. 1 is a block diagram schematically illustrating the configuration of a moving body tracking system 100 according to the first embodiment.

The moving body tracking system 100 includes multiple cameras 110, moving body detecting devices 120, and a moving body tracking device 130.

The moving body tracking system 100 tracks the movement of a tracking target moving body that is to be tracked in a monitored area in which multiple moving bodies are moving around.

The moving body detecting devices 120 and the moving body tracking device 130 are connected to a network 101.

The moving body tracking device 130 is connected to an elevator system 102 that operates the elevators in the monitored area, which is an area in which the moving bodies are monitored with the cameras 110.

The moving body tracking device 130 is connected to a display device 103 for displaying various screen images.

The mobile tracking system 100 illustrated in FIG. 1 should include at least one moving body detecting device 120 and at least one moving body tracking device 130.

However, it is possible that the moving body tracking device 130 be provided with the functions of the moving body detecting device 120. In such a case, the moving body detecting device 120 need not be provided, and the image data of the images captured by the cameras 110 should be sent to the moving body tracking device 130.

The number of cameras 110 connected to each moving body detecting device 120 is not limited to two.

The cameras 110 are disposed in the monitored area. Each of the cameras 110 is an image capturing device for capturing images. The image data of the images captured by each camera 110 is given to a moving body detecting device 120.

The moving body detecting device 120 analyzes the images from the cameras 110 to detect moving bodies and extract the features of the detected moving bodies.

Figure 2:
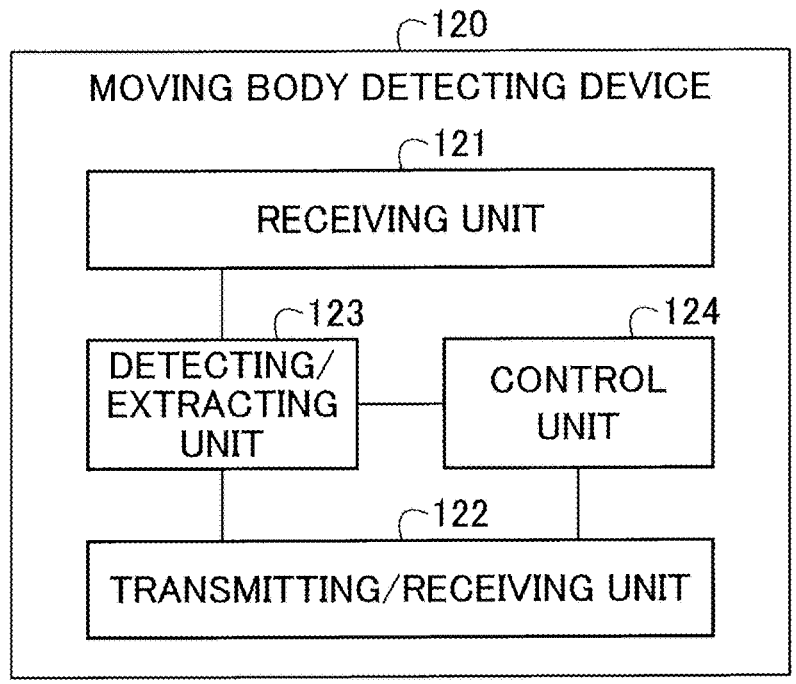
FIG. 2 is a block diagram schematically illustrating the configuration of a moving body detecting device.

FIG. 2 is a block diagram schematically illustrating the configuration of the moving body detecting device 120.

The moving body detecting device 120 includes a receiving unit 121, a transmitting/receiving unit 122, a detecting/extracting unit 123, and a control unit 124.

The receiving unit 121 receives image data of images captured by the cameras 110 connected to the moving body detecting device 120. The received image data is given to the detecting/extracting unit 123.

The transmitting/receiving unit 122 communicates with the network 101.

The detecting/extracting unit 123 detects a moving body in the images captured by a target camera selected by the moving body tracking device 130 as described below, and extracts features of the detected moving body. For example, the detecting/extracting unit 123 detects a moving body in the image indicated by the image data from the receiving unit 121 and extracts the features of the detected moving body, in accordance with an instruction from the control unit 124. The detecting/extracting unit 123 then generates moving body information indicating the detected moving body, the features extracted from the moving body, and camera identification information for identifying the camera 110 that captured the image from which the features were extracted. The moving body information is sent to the moving body tracking device 130 via the transmitting/receiving unit 122. The camera identification information is also referred to as image capturing device identification information.

The control unit 124 acquires instruction information indicating an instruction from the moving body tracking device 130 via the transmitting/receiving unit 122. The control unit 124 switches between an activated state and a deactivated state in accordance with an instruction indicated by the acquired instruction information, where, in the activated state, the detecting/extracting unit 123 detects moving bodies and extracts their features, and in the deactivated state, the detecting/extracting unit 123 does not detect the moving bodies and does not extract their features. The activation state and the deactivated state can be switched for each camera 110 connected to the moving body detection device 120.

Figure 3A:
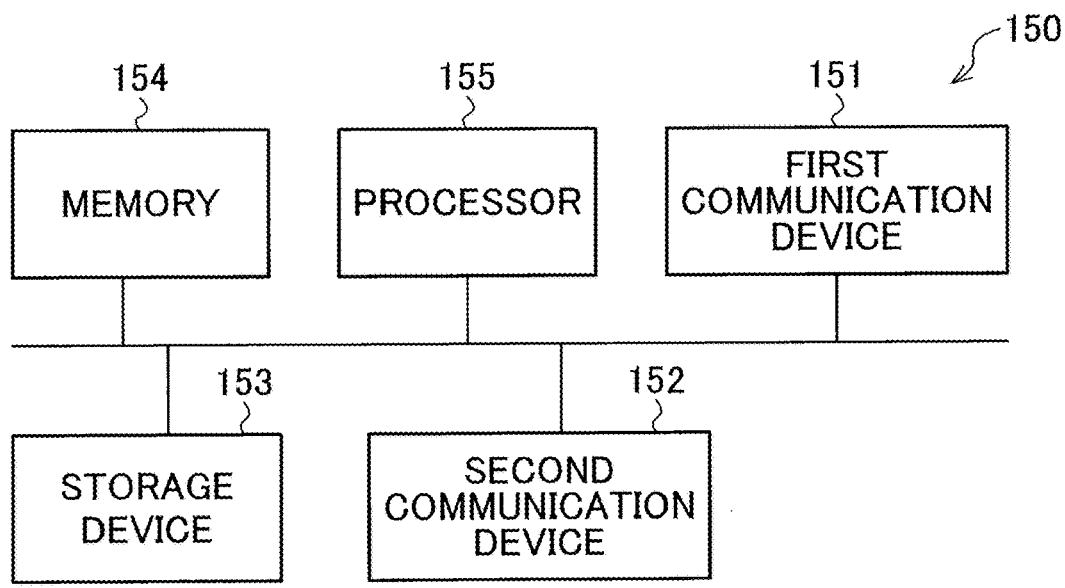
FIGS. 3A and 3B are block diagrams illustrating hardware configuration examples of a moving body detecting device.

The moving body detecting device 120 described above can be implemented by, for example, a computer 150, as illustrated in FIG. 3A.

The computer 150 includes a first communication device 151, a second communication device 152, a storage device 153, a memory 154, and a processor 155.

The first communication device 151 communicates with the cameras 110.

The second communication device 152 communicates with the network 101.

The storage device 153 stores data and programs necessary for the processing by the moving body detecting device 120.

The memory 154 temporarily stores the data and programs and provides a work area for the processor 155.

The processor 155 loads the programs stored in the storage device 153 to the memory 154 and executes the programs to cause the moving body detecting device 120 to execute the processing.

For example, the receiving unit 121 can be implemented by the first communication device 151.

The transmitting/receiving unit 122 can be implemented by the second communication device 152.

The detecting/extracting unit 123 and the control unit 124 can be implemented by the processor 155 loading the programs stored in the storage device 153 to the memory 154 and executing these programs.

Each component of the moving body detecting device 120 illustrated in FIG. 1 can be provided as an individual device.

Figure 3B:
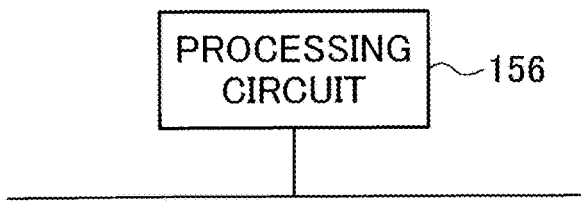

In such a case, a portion or the entirety of the detecting/extracting unit 123 and the control unit 124 can be implemented by, for example, a processing circuit 156, such as a single circuit, a composite circuit, a processor running on a program, a parallel processor running on a program, an application-specific integrated circuit (ASIC) or a field programmable gate array (FPGA), as illustrated in FIG. 3B.

In other words, the detecting/extracting unit 123 and the control unit 124 can be implemented by processing circuitry.

Referring back to FIG. 1, the moving body tracking device 130 tracks a moving body detected by the moving body detecting device 120.

The moving body tracking device 130 includes a network communication unit 131, an elevator system communication unit 132, a connection interface unit (connection I/F unit) 133, an information acquiring unit 134, a tracking target designating unit 135, a monitoring space database unit (monitoring space DB unit) 136, an elevator information acquiring unit 137, a selecting unit 138, a comparing unit 139, and a tracking managing unit 140.

Each component of the moving body tracking device 130 can be provided as an individual device.

The network communication unit 131 communicates with the network 101.

The elevator system communication unit 132 communicates with the elevator system 102.

The connection I/F unit 133 is an interface connecting to the display device 103.

The information acquiring unit 134 acquires moving body information from each moving body detecting device 120 via the network communication unit 131. The acquired moving body information is given to the tracking target designating unit 135 and the comparing unit 339.

The tracking target designating unit 135 refers to the acquired moving body information to designate a detected moving body as a tracking target moving body, which is a target to be tracked. The tracking target designating unit 135 then generates tracking target feature information indicating the features of the tracking target moving body from the acquired moving body information and stores the tracking target feature information in the monitoring space DB unit 136.

The monitoring space DB unit 136 is a storage unit that stores monitoring space information indicating the arrangement and the state of each of the cameras 110 in the monitored area and moving body tracking information indicating the movement path of the tracking target moving body.

The monitoring space DB unit 136 stores connection information indicating which moving body detecting device 120 the cameras 110 are connected to.

The monitoring space DB unit 136 stores the tracking target feature information provided from the tracking target designating unit 135.

The elevator information acquiring unit 137 acquires elevator operation information indicating the operation status of each elevator in the monitored area from the elevator system 102 controlling the operation of the elevators via the elevator system communication unit 132.

The selecting unit 138 selects at least one camera as a target camera from the cameras 110 disposed in the monitored area. For example, the selecting unit 138 refers to the monitoring space information and selects, from the cameras 110, a target camera, which is the camera 110 that captures the image from which a moving body is detected, and the features of the moving body are extracted.

When the tracking target moving body boards an elevator, the selecting unit 138 refer to the monitoring space information and the elevator operation information to select the target camera from the cameras 110. For example, when the tracked moving object boards an elevator, the selecting unit 138 refers to the elevator operation information to specify a target floor that is a floor on which the tracking target moving body is likely to unboard the elevator and selects, from the cameras 110, a target camera that is at least one camera disposed on the target floor.

For example, the selecting unit 138 can specify the stop floor of the elevator as the target floor. Alternatively, the selecting unit 138 can specify, as the target floor, the floor that has been registered as the stop floor through call registration or destination floor registration within a specific period of time after the tracking target moving body boarded the elevator.

The selecting unit 138 then sends instruction information (also referred to as activation instruction information) indicating the camera identification information of the camera 110 selected as the target camera and an activation instruction that activates a moving body detection process and a feature extraction process, to the moving body detecting device 120 connected to the camera 110 selected as the target camera via the network communication unit 131. The moving body detecting device 120 connected to the camera 110 selected as the target camera can be specified by referring to the connection information stored in the monitoring space DB unit 136.

The selecting unit 138 sends instruction information (also referred to as deactivation instruction information) indicating the camera identification information of the cameras 110 not selected as the target camera and a deactivation instruction that deactivates the moving body detection process and the feature extraction process, to the moving body detecting devices 120 connected to the cameras 110 not selected as the target camera via the network communication unit 131.

The selecting unit 138 sets the state of the camera 110 selected as the target camera to "activated" and sets the state of the cameras 110 not selected as the target camera to "deactivated," in the monitoring space information stored in the monitoring space DB unit 136.

The comparing unit 139 compares a target feature, which is a feature extracted from the images captured by the camera 110 selected as a target camera, with a feature of the tracking target moving body, to identify the tracking target moving body in the multiple moving bodies. Specifically, the comparing unit 139 compares the features indicated by the moving body information generated by the moving body detecting device 120 from the images captured by the cameras 110 with the features of the tracking target moving body indicated by the tracking target feature information stored in the monitoring space DB unit 136, to determine whether or not the moving bodies captured in the images taken by the cameras 110 are identical to the tracking target moving body.

The comparing unit 139 compares the features indicated by the moving body information generated from the images captured by the camera 110 selected as the target camera by the selecting unit 138 with the features of the tracking target moving body, to reduce the processing load.

The tracking managing unit 140 tracks the tracking target moving body in the monitored area on the basis of the position of the target camera, the time at which an image capturing a moving body that has been identified as the tracking target moving body has been taken, and the positions of the detected moving body in the image.

Specifically, the tracking managing unit 140, for example, refers to the monitoring space information to specify the position of a moving body determined to be identical to the tracking target moving body by the comparing unit 139 on the basis of the position of the camera 110 that has taken the image capturing the moving body, and adds the position of the moving body and the time to the moving body tracking information to determine the movement path of the tracking target moving body.

The tracking managing unit 140 generates, from the moving body tracking information, moving body tracking display information for displaying the movement path of the tracking target moving body. The tracking managing unit 140 then sends the moving body tracking display information to the display device 103 via the connection I/F unit 133 to cause the movement path to appear on the display device 103.

Figure 4A:
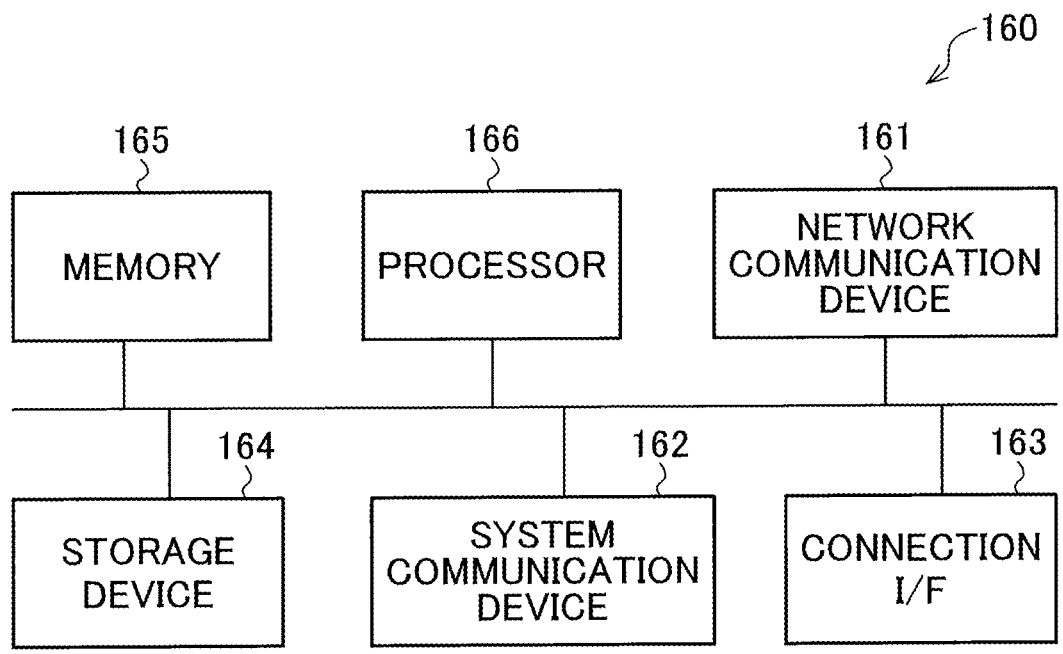
FIGS. 4A and 4B are block diagrams illustrating hardware configuration examples of a moving body tracking device.

The moving body tracking device 130 described above can be implemented by, for example, a computer 160, as illustrated in FIG. 4A.

The computer 160 includes a network communication device 161, a system communication device 162, a connection interface (connection I/F) 163, a storage device 164, a memory 165, and a processor 166.

The network communication device 161 communicates with the network 101.

The system communication device 162 communicates with the elevator system 102.

The connection I/F 163 is an interface connecting to the display device 103.

The storage device 164 stores data and programs necessary for processing by the moving body tracking device 130.

The memory 165 temporarily stores the data and programs and provides a work area for the processor 166.

The processor 166 loads the programs stored in the storage device 164 to the memory 165 and executes the programs to cause the moving body tracking device 130 to execute the processing.

For example, the network communication unit 131 can be implemented by the network communication device 161.

The elevator system communication unit 132 can be implemented by the system communication device 162.

The connection I/F unit 133 can be implemented by the connection I/F 163.

The monitoring space DB unit 136 can be implemented by the storage device 164 or the memory 165.

The information acquiring unit 134, the tracking target designating unit 135, the elevator information acquiring unit 137, the selecting unit 138, the comparing unit 139, and the tracking managing unit 140 can be implemented by the processor 166 loading the programs stored in the storage device 164 to the memory 165 and executing these programs.

Each component of the moving body tracking device 130 illustrated in FIG. 1 can be provided as an individual device.

Figure 4B:
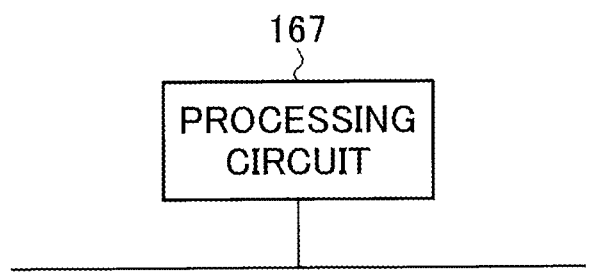

In such a case, a portion or the entirety of the information acquiring unit 134, the tracking target designating unit 135, the elevator information acquiring unit 137, the selecting unit 138, the comparing unit 139, and the tracking managing unit 140 can be implemented by, for example, a processing circuit 167, such as a single circuit, a composite circuit, a processor running on a program, a parallel processor running on a program, an ASIC, or an FPGA, as illustrated in FIG. 4B.

In other words, the information acquiring unit 134, the tracking target designating unit 135, the elevator information acquiring unit 137, the selecting unit 138, the comparing unit 139, and the tracking managing unit 140 can be implemented by processing circuitry.

Figure 5:
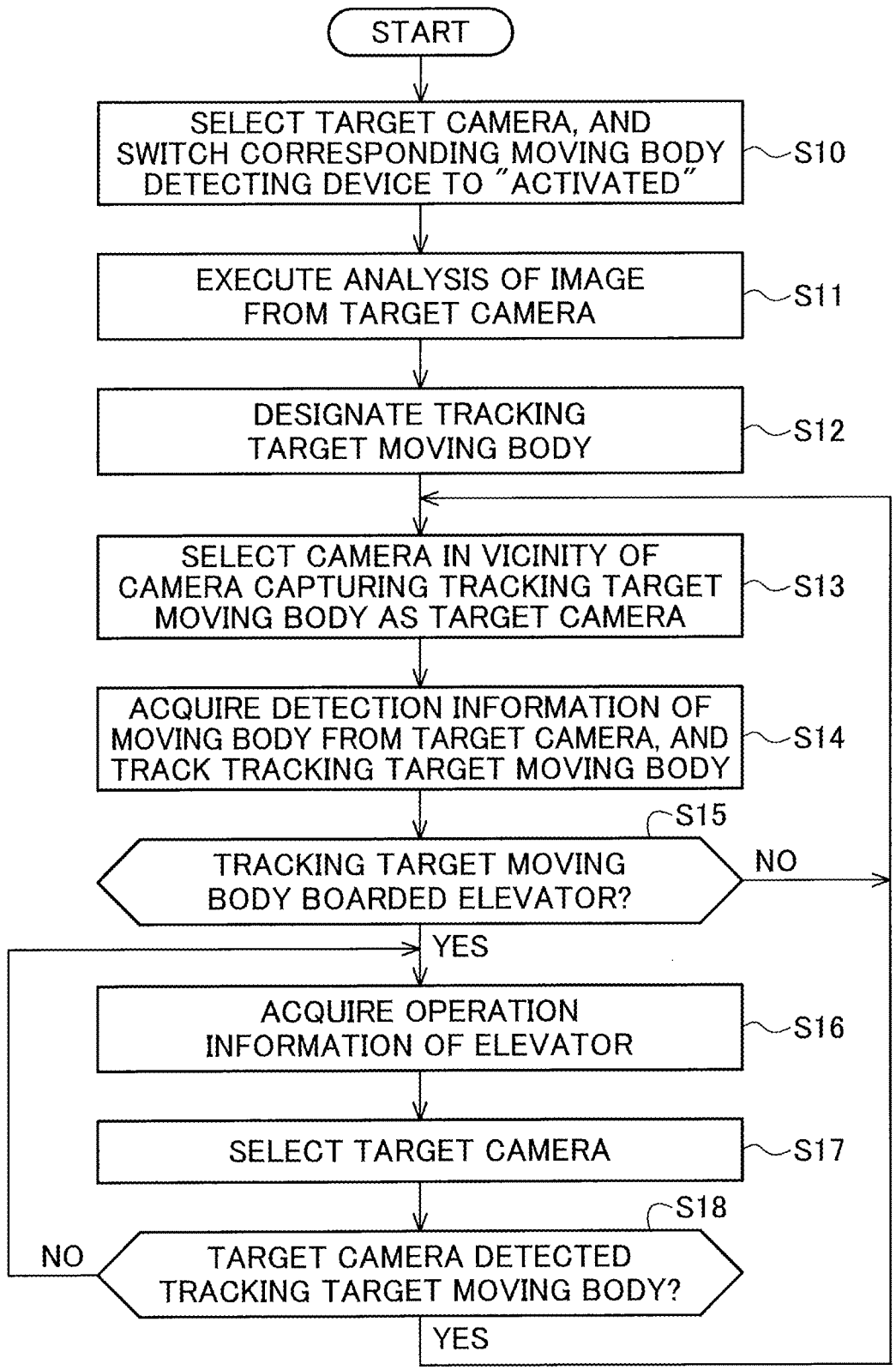
FIG. 5 is a flowchart illustrating a process executed by a moving body tracking system according to the first embodiment.

FIG. 5 is a flowchart illustrating the process executed by the moving body tracking system 100.

In an initial state, the selecting unit 138 has a camera 110 preset as a selected target camera, and switches the moving body detecting device 120 connected to the target camera to an activated state to execute the processes (step S10). The selecting unit 138 then registers the activated or deactivated state of the camera 110 selected as the target camera to the monitoring space information stored in the monitoring space DB unit 136.

The selecting unit 138 sends activation instruction information to the moving body detecting device 120 connected to the camera 110 selected as the target camera and sends deactivation instruction information to the moving body detecting devices 120 connected to the cameras 110 not selected as the target camera, via the network communication unit 131. In this way, moving body information corresponding to a moving body detected in the images captured by the target camera is sent only from the moving body detecting device 120 connected to the camera 110 selected as the target camera.

The target camera may be set in advance so that a camera 110 installed in a specific site, such as an entrance/exit gate of a building is selected. The images obtained from all the cameras 110 installed in the monitored area may be displayed on the display device 103, and a guard may check the images and select the target camera through operation using a graphical user interface (GUI). Here, one or more cameras 110 are selected.

The moving body detecting device 120 connected to the camera 110 selected as the target camera detects a moving body in the images from the target camera and extracts the features of the detected moving body (step S11). The detection of the moving body and the extraction of the features can be performed by using a known technique using a convolutional neural network or the like. The moving body detecting device 120 then generates moving body information indicating the detected moving body and the extracted features and sends it to the moving body tracking device 130.

Subsequently, the information acquiring unit 134 acquires the moving body information from the moving body detecting device 120 connected to the target camera via the network communication unit 131 and gives the acquired moving body information to the tracking target designating unit 135. The tracking target designating unit 135 designates one of the moving bodies indicated by the moving body information from the information acquiring unit 134 as a tracking target moving body, which is the moving body to be tracked (step S12). The tracking target designating unit 135 then generates tracking target feature information indicating the features of the tracking target moving body and records the tracking target feature information in the monitoring space DB unit 136.

The tracking target moving body may be designated by a guard using a GUI while checking the images obtained from the target camera displayed on the display device 103. Alternatively, all moving bodies passing through a specific area, such as an entrance gate, may be designated as tracking target moving bodies. Alternatively, the images obtained from the target camera may be analyzed to detect a predetermined moving body such as a suspicious person, and the moving body determined as the predetermined moving body such as a suspicious person may be automatically designated as the tracking target moving body.

The designation of the tracking target moving body starts a tracking process of comparing the features of the moving bodies captured in the images from the respective cameras 110, but the tracking target moving body immediately after the designation is not captured in images taken by cameras 110 installed in a site remote from the target camera, i.e., cameras 110 installed on other floors. Such cameras 110 should be excluded from the target camera because moving bodies having similar features detected in the images captured by such cameras 110 causes erroneous identification and erroneous tracking.

The selecting unit 138 refers to the monitoring space information stored in the monitoring space DB unit 136 to select the camera 110 that is currently capturing the tracking target moving body and the cameras 110 in the vicinity as the target cameras (step S13). The selecting unit 138 then sends activation instruction information to the moving body detecting devices 120 connected to the cameras 110 selected as the target cameras via the network communication unit 131, and sends deactivation instruction information to the moving body detecting devices 120 connected to cameras 110 not selected as the target cameras. The selecting unit 138 updates the monitoring space information stored in the monitoring space DB unit 136.

As the selection method of the target cameras, the camera 110 that is currently capturing the tracking target moving body and the cameras 110 having image capture ranges adjacent to that of the camera 110 currently capturing the tracking target moving body may be selected as the target cameras. The cameras 110 on the same floor as the camera 110 currently capturing the tracking target moving body may be collectively selected as the target cameras. The cameras 110 selected here are cameras 110 installed in an area of possible normal movement of the tracking target moving body or the like, so that the cameras 110 are not necessarily installed without any blind spots in the image capture area in the monitored area. When the selection of the target cameras is completed, the moving body detection process and the feature extraction process for the images from the target cameras are activated, and the state of the cameras 110 selected as the target cameras is updated to "activated" in the monitoring space information stored in the monitoring space DB unit 136.

As a result of a comparison between the features extracted from the images from the target cameras and the features of the tracking target moving body, the moving body detection process and the feature extraction process for the target cameras that have not captured images of the tracking target moving body are deactivated, and the monitoring space information stored in the monitoring space DB section 136 is updated. Then, the target cameras are updated. By repeating such processing, the target cameras are switched in accordance with the movement of the tracking target moving body.

This will be described below.

The moving body information acquired from the moving body detecting devices 120 connected to a target camera is given to the comparing unit 139. The comparing unit 139 compares the features indicated by the moving body information with the features indicated by the tracking target feature information to identify a moving body being captured by any one of the target cameras and the tracking target moving body. The comparing unit 139 then gives the processing result to the tracking managing unit 140. As the processing result, for example, information indicating the position of the camera 110 that captured the moving body identified as the tracking target moving body, the date and time when the image captured by the camera 110, and the position of the moving body identified as the tracking target moving body in the image captured by the camera 110 may be given to the tracking managing unit 140 as comparison result information.

The tracking managing unit 140 then specifies the position of the moving body identified as the tracking target moving body from the processing result from the comparing unit 139, and registers the position of the specified moving body and the date and time when the image of the moving body was captured to the moving body tracking information stored in the monitoring space DB unit 136 (step S14). The above process is repeated to enable the tracking of the tracking target moving body.

Now, a case in which the tracking target moving body moves between floors by using an elevator will be explained. Usually, when the tracking target moving body boards an elevator, the tracking target moving body moves out of the image capture range of the cameras 110. Thus, it is difficult to predict the destination floor of the tracking target moving body, and thus, it cannot be determined which camera 110 should be selected next as the target camera.

Thus, the selecting unit 138 determines whether or not the tracking target moving body boarded the elevator (step S15). If the tracking target moving body boarded the elevator (Yes in step S15), the process proceeds to step S16; if the tracking target moving body does not board the elevator (No in step S15), the process returns to step S13.

Regarding the determination as to whether or not the tracking target moving body has boarded the elevator, it can be determined that the tracking target moving body has boarded the elevator if the moving direction is determined to be a direction toward the elevator on the basis of analysis of the images captured by a camera 110 installed in an area such as an elevator hall where the elevator is located. If the tracking target moving body detected by the camera 110 installed in the site of the elevator is not detected by any of the other cameras 110 installed in the vicinity or on the same floor of the elevator, it can be determined that the tracking target moving body has boarded the elevator. When the tracking target moving body is no longer detected by the cameras 110 installed in the site of the elevator, whether or not a boardable elevator had stopped on that floor can be added to the determination condition.

In step S16, the elevator information acquiring unit 137 acquires elevator operation information from the elevator system 102 via the elevator system communication unit 132. The acquired elevator operation information is given to the selecting unit 138.

The selecting unit 138 selects the target camera on the basis of the received elevator operation information and the monitoring space information stored in the monitoring space DB unit 136 (step S17). The selecting unit 138 then sends activation instruction information to the moving body detecting device 120 connected to the camera 110 selected as the target camera via the network communication unit 131, and sends deactivation instruction information to the moving body detecting devices 120 connected to the cameras 110 not selected to be the target camera via the network communication unit 131. The selecting unit 138 sets the state of the camera 110 selected as the target camera to "activated" and sets the state of the cameras 110 not selected as the target camera to "deactivated," in the monitoring space information stored in the monitoring space DB unit 136.

The elevator operation information used here indicates, for example, the stop floor designated through the call registration or destination floor registration performed in the elevator and the date and time of the call registration or destination floor registration.

In such a case, the selecting unit 138 can select a camera 110 on the floor on which the elevator stopped as the target camera. All cameras 110 on the floor on which the elevator stopped may be selected as target cameras, or the cameras 110 installed in the vicinity of the elevator (for example, a predetermined area around the elevator) may be selected as target cameras. Alternatively, the selecting unit 138 may select, as target cameras, the cameras 110 on the floor newly selected through call registration or destination floor registration within a certain period after the tracking target moving body boarded the elevator.

As described above, since the cameras 110 on the floor (for example, the floor that was skipped) on which there is no possibility of the tracking target moving body having unboarding the elevator can be excluded from the target cameras, it is possible to avoid cases in which the tracking target moving body is erroneously identified even when moving bodies having features similar to those of the tracking target moving body are present on the floors that were skipped. Since the images from the cameras 110 on the skipped floors need not be processed by the moving body detecting devices 120, the processing load of the moving body detecting devices 120 and the power consumption can be reduced.

Similar to step S14 of the process, the comparing unit 139 compares the features extracted from an image captured by a target camera with the features of the tracking target moving body and determines whether or not the target camera has captured the tracking target moving body (step S18). Such determination of whether or not the moving body captured by the target camera is the same as the tracking target moving body is referred to as identification. If it is determined that the tracking target moving body is captured by the target camera (Yes in step S18), the tracking managing unit 140 registers the position of the detected tracking target moving body and the date and time of image capturing to the tracking target moving body information stored in the monitoring space DB unit 136, as in step S14, and the process returns to step S13. If it is determined that the tracking target moving body is not captured by the target camera (No in step S18), the process returns to step S16 in which the elevator information acquiring unit 137 acquires the elevator operation information from the elevator system 102 via the elevator system communication unit 132, and the selecting unit 138 selects a camera 110 on another floor where the elevator had stopped as the target camera (step S17).

Thus, when the elevator stops on more than one floor and the tracking target moving body is not detected in an image captured by the target camera, the cameras 110 on a floor on which the elevator has stopped can be sequentially selected as target cameras to surely detect the tracking target moving body.

In this case, when the tracking target moving body is detected (Yes in step S18), only the cameras 110 in the vicinity of the camera 110 that had captured an image of the tracking target moving body are selected as the target cameras (step S13), so that the cameras 110 on the floors that are not the target floor can be excluded from the target cameras.

As described above, according to the first embodiment, it is possible to effectively narrow down the destination candidates of the tracking target moving body, the identification and tracking accuracy of moving bodies are improved, and detection of moving bodies and extraction of their features by the cameras 110 that are not target cameras are not performed, thereby the computational processing load of the entire system is reduced.

Second Embodiment

As illustrated in FIG. 1, a moving body tracking system 200 according to the second embodiment includes multiple cameras 110, moving body detecting devices 120, and a moving body tracking device 230.

The cameras 110 and the moving body detecting devices 120 of the moving body tracking system 200 according to the second embodiment are respectively the same as the cameras 110 and the moving body detecting devices 120 of the moving body tracking system 100 according to the first embodiment.

As illustrated in FIG. 1, the moving body tracking device 230 includes a network communication unit 131, an elevator system communication unit 132, a connection I/F unit 133, an information acquiring unit 134, a tracking target designating unit 135, a monitoring space DB unit 136, an elevator information acquiring unit 137, a selecting unit 238, a comparing unit 139, and a tracking managing unit 140.

Each component of the moving body tracking device 230 can be provided as an individual device.

The network communication unit 131, the elevator system communication unit 132, the connection I/F unit 133, the information acquiring unit 134, the tracking target designating unit 135, the monitoring space DB unit 136, the elevator information acquiring unit 137, the comparing unit 139, and the tracking managing unit 140 of the moving body tracking device 230 according to the second embodiment are respectively the same as the network communication unit 131, the elevator system communication unit 132, the connection I/F unit 133, the information acquiring unit 134, the tracking target designating unit 135, the monitoring space DB unit 136, the elevator information acquiring unit 137, the comparing unit 139, and the tracking managing unit 140 of the moving body tracking device 130 according to the first embodiment.

The selecting unit 238 refers to the monitoring space information and selects, from the cameras 110, a target camera, which is a camera 110 that detects a moving body and captures an image used for the extraction of the features of the moving body.

When the tracking target moving body boards an elevator, the selecting unit 238 refers to the monitoring space information and the elevator operation information and selects the target camera from the cameras 110.

When the selecting unit 238 selects the target camera by referring to also the elevator operation information, i.e., when the tracking target moving body boards the elevator, an activation period is set for the selection of a target camera for each target camera.

The arrival time of the elevator to each stop floor may be used for setting the activation period. For example, when a camera 110 installed in an area such as an elevator hall where the elevator is installed on a stop floor selected through call registration or destination floor registration is selected as a target camera, a predetermined period after the arrival of the elevator can be set as the activation period. When it is not determined that all of the features of the moving body detected during the activation period coincide with all of the features of the tracking target moving body, it is presumed that the tracking target moving body did not unboard the elevator on the corresponding floor, and the moving body detection process and the feature extraction process for the camera selected as the target camera are deactivated. In this way, it is possible to suppress unnecessary execution of the moving body detection process and the feature extraction process on floors on which the tracking target moving body is absent.

The setting of the activation period is an example, and the door opening/closing time information for the stop floor of the elevator may be used. In such a case, the activation period is set to be a period from the time at which the elevator arrives on the corresponding floor and starts the door opening to the time at which the door closing is completed. A certain margin is set for the activation period, and a certain period after the completion of door closing may be included in the activation period. By using the door opening/closing information for setting of the activation period, detection omission can be prevented and the tracking target moving body can be tracked even when the tracking target moving body unboards the elevator a while after the arrival of the elevator due to crowding of the elevator car or the elevator hall on each floor or the large number of passengers boarding or unboarding the elevator. By setting a certain margin, it is possible to appropriately select the target cameras while preventing detection omission in the case where the tracking target moving body cannot be detected because of accidentally being hidden behind another passenger when unboarding the elevator.

The selecting unit 238 then sends activation instruction information indicating an activation instruction that activates the moving body detection process and the feature extraction process and the camera identification information of the camera 110 selected as the target camera, to the moving body detecting device 120 connected to the camera 110 selected as the target camera via the network communication unit 131.

The selecting unit 238 sends deactivation instruction information indicating a deactivation instruction that deactivates the moving body detection process and the feature extraction process and camera identification information of the cameras 110 not selected as the target camera, to the moving body detecting devices 120 connected to the cameras 110 not selected as the target camera via the network communication unit 131.

The selecting unit 238 sets the state of the camera 110 selected as the target camera to "activated" and sets the state of the cameras 110 not selected as the target camera to "deactivated," in the monitoring space information stored in the monitoring space DB unit 136.

As described above, the selecting unit 238 according to the second embodiment sets an activation period for the selection of the target camera, and when the tracking target moving body is not identified within the activation period, the selection of the target camera is canceled, and one or more cameras that have not been selected as the target camera are selected as new target cameras from the multiple cameras 110.

The selecting unit 238 can set a predetermined period after the elevator stops as the activation period of the target camera disposed on the floor on which the elevator stopped. Alternatively, the selecting unit 238 may set a predetermined period after the elevator stops and the door of the elevator opens as the activation period of the target camera disposed on the floor on which the elevator stopped. The predetermined period may be the period until the door closes or the period until a predetermined additional period elapses after the door closes.

Figure 6:
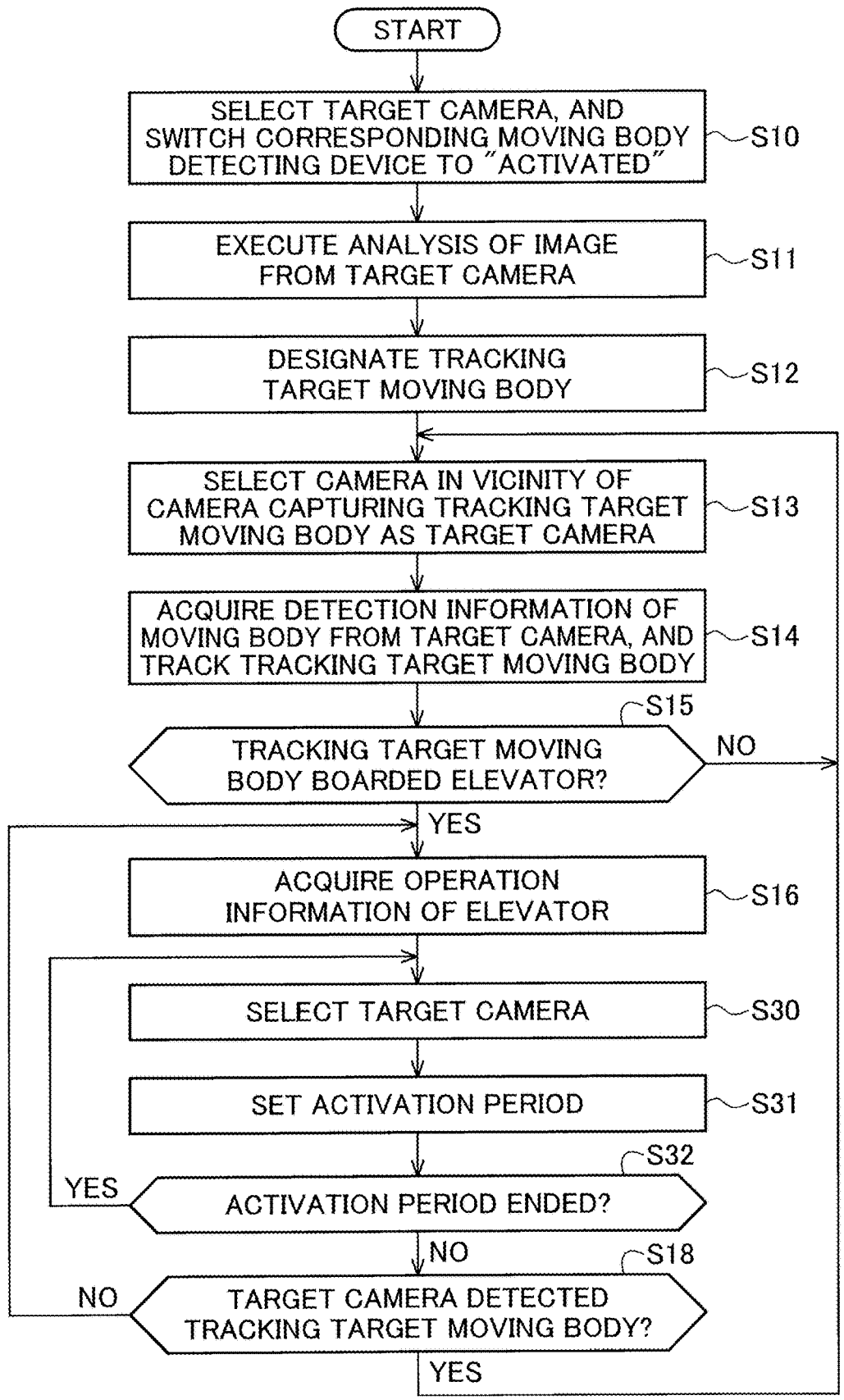
FIG. 6 is a flowchart illustrating a process executed by a moving body tracking system according to the second embodiment.

FIG. 6 is a flowchart illustrating a process executed by the moving body tracking system 200 according to the second embodiment.

Note that, among the steps illustrated in FIG. 6, the steps that are the same as those illustrated in FIG. 5 are denoted by the same reference numerals as those in FIG. 5.

Steps S10 to S16 of the process in FIG. 6 are the same as steps S10 to S16 of the process in FIG. 5. However, in FIG. 6, the process proceeds to step S30 after step S16 of the process.

In step S30, the selecting unit 238 selects the target camera on the basis of the received elevator operation information and the monitoring space information stored in the monitoring space DB unit 136, as in the first embodiment. The selecting unit 238 then sends activation instruction information to the moving body detecting device 120 connected to the camera 110 selected as the target camera via the network communication unit 131, and sends deactivation instruction information to the moving body detecting devices 120 connected to the cameras 110 not selected as the target camera via the network communication unit 131. The selecting unit 238 sets the state of the camera 110 selected as the target camera to "activated" and sets the state of the cameras 110 not selected as the target camera to "deactivated," in the monitoring space information stored in the monitoring space DB unit 136.

Subsequently, the selecting unit 238 sets an activation period for the target camera selected in step S30 (step S31). In this way, an activation period is set for the moving body detection process and the feature extraction process executed by the moving body detecting device 120 connected to the camera 110 selected as the target camera.

The selecting unit 238 then determines whether or not the activation period set in step S31 has ended (step S32). If the activation period has ended (Yes in step S32), the process returns to step S30, and the selecting unit 238 selects a camera 110 other than that selected as the target camera as a new target camera. For example, a camera 110 on another floor on which the elevator stopped is selected as the target camera. If the activation period has not ended (No in step S32), the process returns to step S18.

Step S18 of the process in FIG. 6 is the same as step S18 of the process in FIG. 3.

In the first embodiment, the moving body detection process and the feature extraction process are performed on each stop floor until the tracking target moving body is detected, but when the number of elevator stops is large and the tracking target moving body does not unboard the elevator for an extended period of time, there is a risk of an increase in the number of target cameras and a temporary increase in the computational processing load on the entire system. However, according to the second embodiment, by setting an activation period for the selection of the target camera and sequentially switching the target camera of the moving body detection process and the feature extraction process in accordance with the floor on which the elevator arrives, it is possible to avoid unwanted execution of the moving body detection process and the feature extraction process on the floor on which the tracking target moving object unboards the elevator and to prevent the deterioration of the tracking accuracy due to erroneous identification or an unwanted increase of the computational processing load.

Third Embodiment

Figure 7:
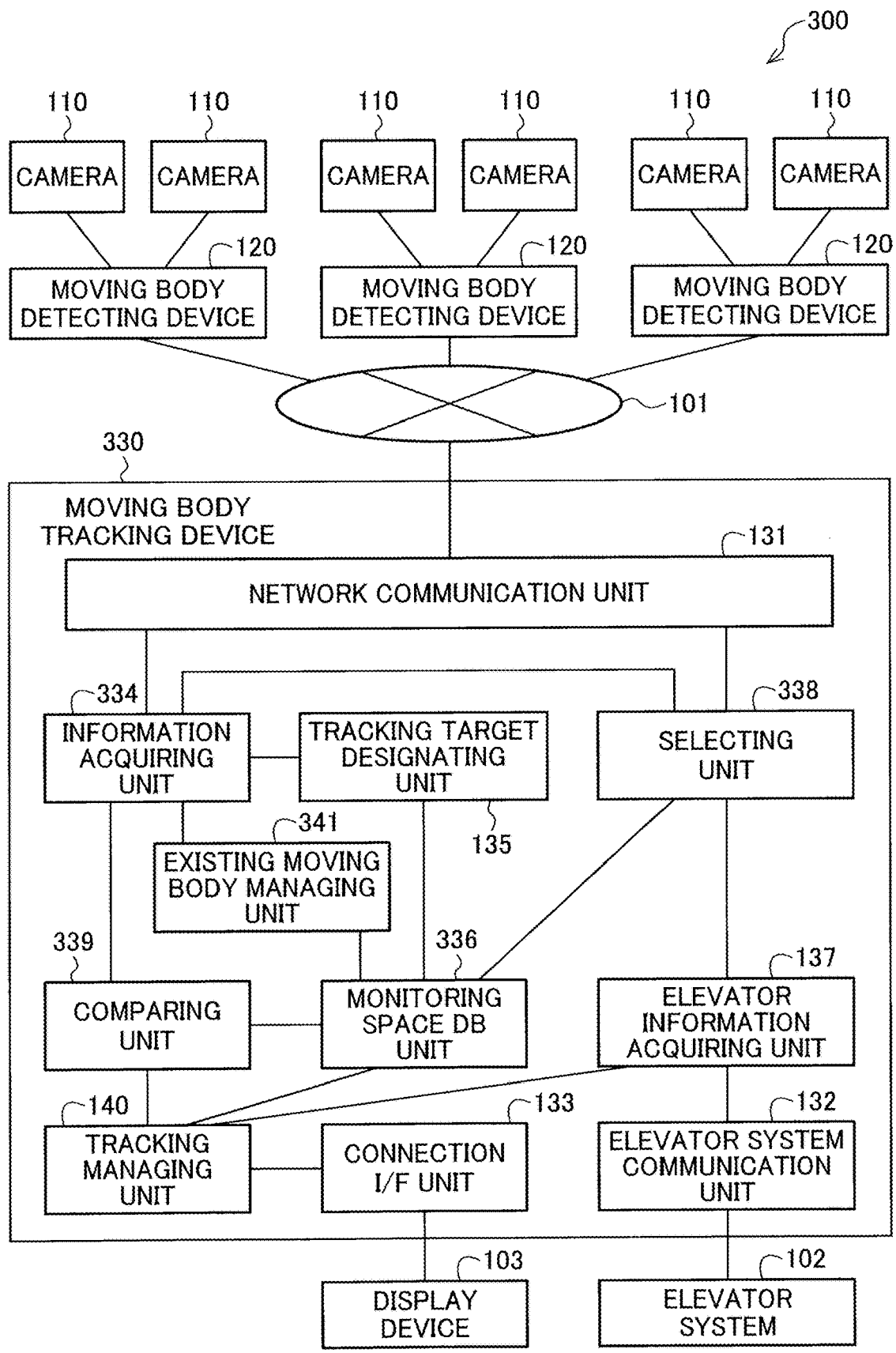
FIG. 7 is a block diagram schematically illustrating the configuration of a moving body tracking system according to a third embodiment.

FIG. 7 is a block diagram schematically illustrating the configuration of a moving body tracking system 300 according to the third embodiment.

As illustrated in FIG. 7, the moving body tracking system 300 according to the third embodiment includes multiple cameras 110, moving body detecting devices 120, and a moving body tracking device 330.

The cameras 110 and the moving body detecting devices 120 of the moving body tracking system 300 according to the third embodiment are respectively the same as the cameras 110 and the moving body detecting devices 120 of the moving body tracking system 100 according to the first embodiment.

As illustrated in FIG. 7 the moving body tracking device 330 includes a network communication unit 131, an elevator system communication unit 132, a connection I/F unit 133, an information acquiring unit 334, a tracking target designating unit 135, a monitoring space DB unit 336, an elevator information acquiring unit 137, a selecting unit 338, a comparing unit 339, a tracking managing unit 140, and an existing moving body managing unit 341.

Each component of the moving body tracking device 330 can be provided as an individual device.

The network communication unit 131, the elevator system communication unit 132, the connection I/F unit 133, the tracking target designating unit 135, the elevator information acquiring unit 137, and the tracking managing unit 140 of the moving body tracking device 330 according to the third embodiment are respectively the same as the network communication unit 131, the elevator system communication unit 132, the connection I/F unit 133, the tracking target designating unit 135, the elevator information acquiring unit 137, and the tracking managing unit 140 of the moving body tracking device 130 according to the first embodiment.

The information acquiring unit 334 acquires moving body information from each moving body detecting device 120 via the network communication unit 131.

In the third embodiment, the information acquiring unit 334 switches the destination of the acquired moving body information between the tracking target designating unit 135 and the comparing unit 339, and the existing moving body managing unit 341 in accordance with an instruction from the selecting unit 338.

When the existing moving body managing unit 341 receives the moving body information from the information acquiring unit 334, the existing moving body managing unit 341 stores the acquired moving body information as existing moving body information in the monitoring space DB unit 336.

The monitoring space DB unit 336 stores the existing moving body information together with monitoring space information and moving body tracking information.

The selecting unit 338 refers to the monitoring space information and selects, from the cameras 110, a target camera, which is a camera 110 that captures an image to detect a moving body and extract the features of the moving body.

When the tracking target moving body boards an elevator, the selecting unit 338 refers to the monitoring space information and the elevator operation information and selects the target camera from the cameras 110. The selecting unit 338 then instructs the information acquiring unit 334 to switch the destination of the moving body information to the existing moving body managing unit 341. The selecting unit 338 sets a preparatory period during which the selection of the target camera is activated.

When the preparatory period ends, the selecting unit 338 refers to the monitoring space information and the elevator operation information to select the target camera from the cameras 110. The selecting unit 338 then instructs the information acquiring unit 334 to switch the destination of the moving body information to the tracking target designating unit 135 and the comparing unit 339. The selecting unit 338 sets an activation period for the selection of the target camera. The setting of the activation period is the same as that in the second embodiment.

Specifically, the selecting unit 338 selects, as target cameras, some or all of the cameras 110 installed on a stop floor of the elevator selected through call registration or destination floor registration after the tracking target moving body boards the elevator and the elevator starts moving. The preparatory period for the selection is the period from the time the elevator starts moving to the time the elevator arrives on the stop floor.

This enables the acquisition of the moving body information before the tracking target moving body arrives on the floor.

The selecting unit 338 then selects some or all of the cameras 110 on the floor as the target cameras, and sets their activation period to a period from the start of the door opening of the elevator on the floor to the completion of the door opening.

The selecting unit 338 then sends activation instruction information indicating an activation instruction that activates the moving body detection process and the feature extraction process and the camera identification information of the camera 110 selected as the target camera, to the moving body detecting device 120 connected to the camera 110 selected as the target camera via the network communication unit 131.

The selecting unit 338 sends deactivation instruction information indicating a deactivation instruction that deactivates the moving body detection process and the feature extraction process and the camera identification information of the cameras 110 not selected as the target camera, to the moving body detecting devices 120 connected to the cameras 110 not selected as the target camera via the network communication unit 131.

The selecting unit 338 sets the state of the camera 110 selected as the target camera to "activated" and sets the state of the cameras 110 not selected as the target camera to "deactivated," in the monitoring space information stored in the monitoring space DB unit 136.

The comparing unit 339 compares the features indicated by the feature information generated by the moving body detecting device 120 from the image captured by the target camera with the features of the tracking target moving body, to determine whether or not the moving body in the images captured by the cameras 110 is identical to the tracking target moving body.

In the third embodiment, after the tracking target moving body boards the elevator and until the tracking target moving body is detected, the comparing unit 339 compares the features indicated by the moving body information generated from the image captured by the target camera with the features of the tracking target moving body if the features indicated by the moving body information generated from the image captured by the target camera do not coincide with the features indicated by the existing moving body information. This enables a comparison process excluding existing moving bodies, and the processing load is reduced.

As described above, in the third embodiment, the detecting/extracting unit 123 detects an existing moving body that is a moving body detected in a preparatory image captured by the target camera during a preparatory period, which is a predetermined period after the tracking target moving body boards the elevator, and extracts preparatory features, which are features of the existing moving body, from the preparatory image. When the comparing unit 339 cannot determine that target features, which are features extracted from the image captured by the target camera, coincide with the preparatory features after the tracking target moving body boards the elevator, the comparing unit 339 compares the target features with the features of the tracking target moving body to identify the tracking target moving body in the multiple moving bodies.

The preparatory period may be a period until the elevator stops on the target floor or a period until the door of the stopped elevator opens. Here, it is preferable that the preparatory period is a period until the elevator door fully opens.

The moving body tracking device 330 described above can be implemented by, for example, a computer 160, as illustrated in FIG. 4A.

For example, the information acquiring unit 334, the selecting unit 338, the comparing unit 339, and the existing moving body managing unit 341 can be implemented by the processor 166 loading the programs stored in the storage device 164 to the memory 165 and executing these programs.

The monitoring space DB unit 336 can be implemented by the storage device 164.

Each component of the moving body tracking device 330 illustrated in FIG. 7 can be provided as an individual device.

In such a case, for example, a portion or the entirety of the information acquiring unit 334, the selecting unit 338, the comparing unit 339, and the existing moving body managing unit 341 can be implemented by, for example, a processing circuit 167, such as a single circuit, a composite circuit, a processor running on a program, a parallel processor running on a program, an ASIC, or an FPGA, as illustrated in FIG. 4B.

In other words, the information acquiring unit 334, the tracking target designating unit 135, the elevator information acquiring unit 137, the selecting unit 338, the comparing unit 339, the tracking managing unit 140, and the existing moving body managing unit 341 can be implemented by processing circuitry.

Figure 8:
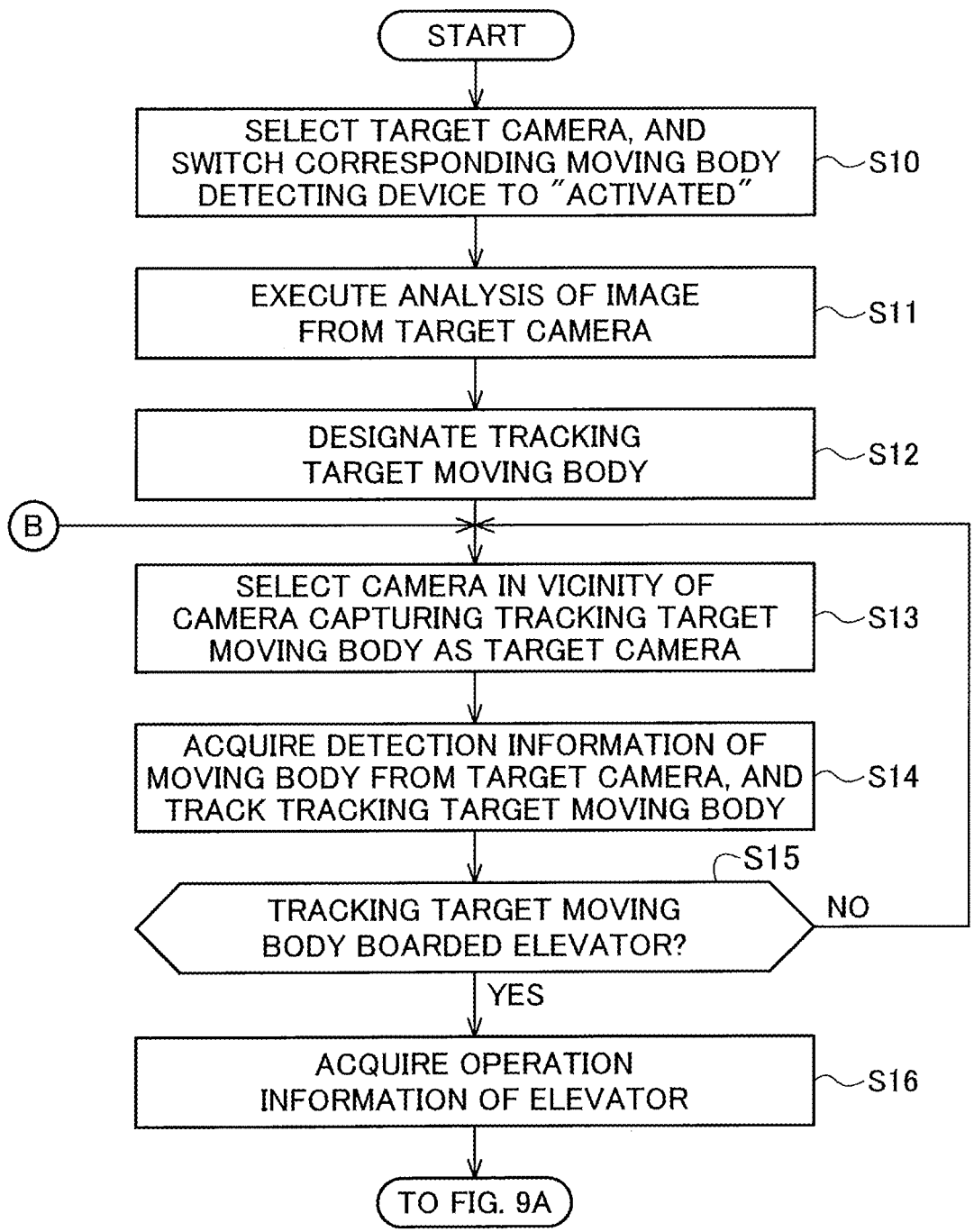
FIG. 8 is a first flowchart illustrating a process executed by the moving body tracking system according to the third embodiment.
Figure 9:
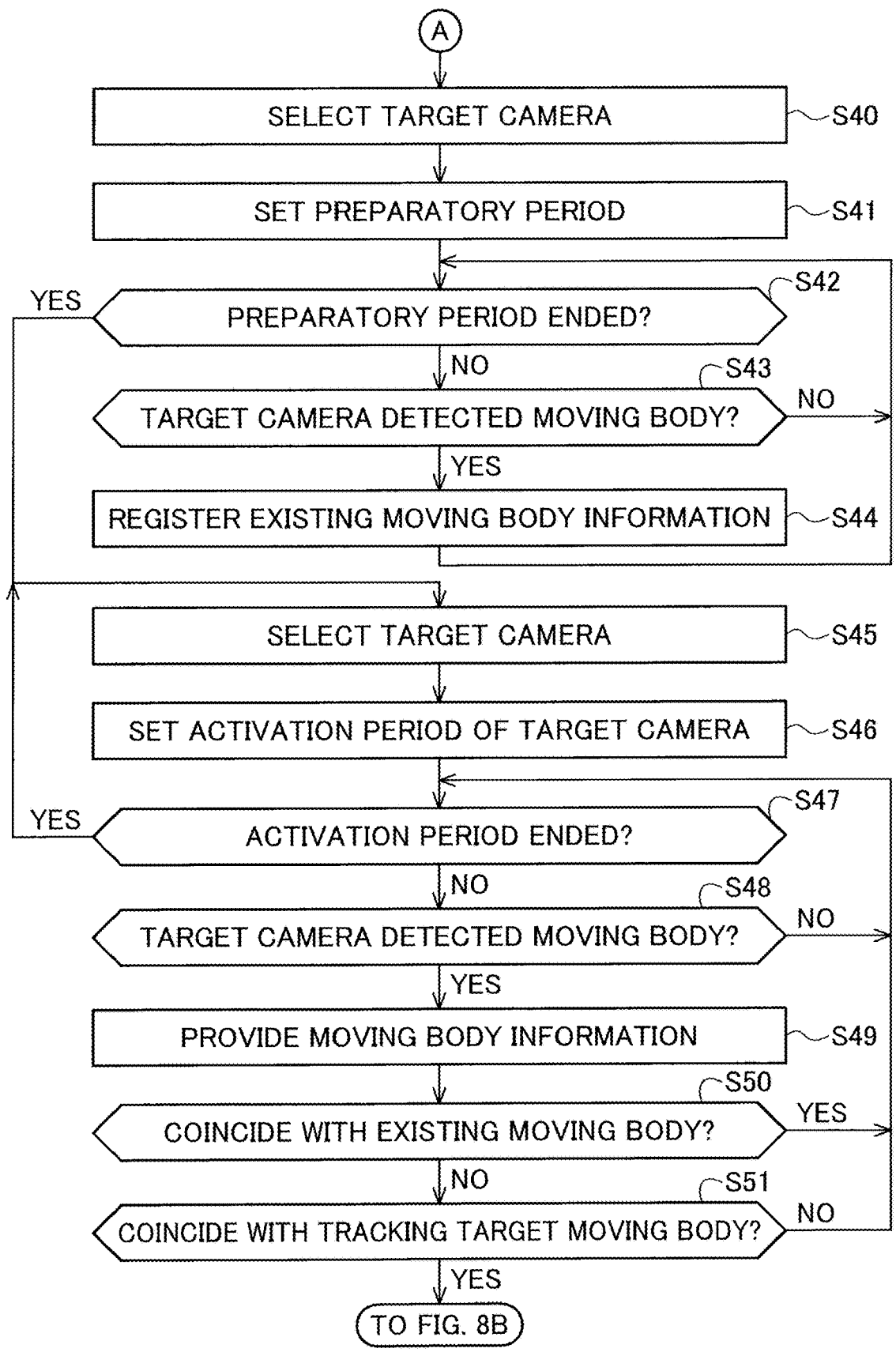
FIG. 9 is a second flowchart illustrating a process executed by the moving body tracking system according to the third embodiment.

FIGS. 8 and 9 are flowcharts illustrating a process executed by the moving body tracking system 300 according to the third embodiment.

Among the steps illustrated in FIGS. 8 and 9, the steps that are the same as those illustrated in FIG. 5 are denoted by the same reference numerals as those in FIG. 5.

It is presumed that the destinations of the moving body information from the information acquiring unit 334 are the tracking target designating unit 135, the comparing unit 339, and the existing moving body managing unit 341.

Steps S10 to S16 of the process in FIG. 8 is the same as steps S10 to S16 of the process in FIG. 5. However, in FIG. 8, the process proceeds to step S40 in FIG. 9 after step S16 of the process.

In step S40 in FIG. 9, the selecting unit 338 refers to the monitoring space information and the elevator operation information to select the target camera from the cameras 110. The selecting unit 338 then sends activation instruction information to the moving body detecting device 120 connected to the camera 110 selected as the target camera via the network communication unit 131, and sends deactivation instruction information to the moving body detecting devices 120 connected to the cameras 110 not selected as the target camera via the network communication unit 131. The selecting unit 338 sets the state of the camera 110 selected as the target camera to "activated" and sets the state of the cameras 110 not selected as the target camera to "deactivated," in the monitoring space information stored in the monitoring space DB unit 336.

The selecting unit 338 instructs the information acquiring unit 334 to switch the destination of the moving body information from the tracking target designating unit 135 and the comparing unit 339 to the existing moving body managing unit 341. In this way, the moving body information sent from the moving body detecting devices 120 connected to the cameras 110 selected as target cameras, as described below, accumulates in the monitoring space DB unit 136 as existing moving body information.

The selecting unit 338 sets a preparatory period during which the selection of the target camera is activated (step S41). Thus, a preparatory period is set for performing the moving body detection process and the feature extraction process in the moving body detecting device 120 connected to the camera 110 selected as the target camera until the elevator arrives on the corresponding floor.

The selecting unit 338 then determines whether or not the preparatory period has ended (step S42). If the preparatory period has ended (Yes in step S42), the process proceeds to step S45; if the preparatory period has not ended (No in step S42), the process proceeds to step S43.

In step S43, the detecting/extracting unit 123 of the moving body detecting device 120 connected to the camera 110 selected as the target camera determines whether or not a moving body has been detected in the images captured by the camera 110 selected as the target camera. If a moving body is detected (Yes in step S43), the process proceeds to step S44; if no moving body is detected (No in step S43), the process returns to step S42.

In step S44, the detecting/extracting unit 123 extracts the features of the detected moving body from the corresponding image, generates moving body information indicating the detected moving body, the extracted features, and the camera identification information of the corresponding camera 110, and sends it to the moving body tracking device 330 via the transmitting/receiving unit 122. The information acquiring unit 334 that has acquired such moving body information via the network communication unit 131 gives the moving body information to the existing moving body managing unit 341. The existing moving body managing unit 341 stores the received moving body information in the monitoring space DB unit 336 as existing moving body information. The process then returns to step S42.

If the preparatory period ends in step S42 (Yes in S42), the process proceeds to step S45.

In step S45, the selecting unit 338 refers to the monitoring space information and the elevator operation information to select the target camera from the cameras 110. The selecting unit 338 then sends activation instruction information to the moving body detecting device 120 connected to the camera 110 selected as the target camera via the network communication unit 131, and sends deactivation instruction information to the moving body detecting devices 120 connected to the cameras 110 not selected as the target camera via the network communication unit 131. The selecting unit 338 sets the state of the camera 110 selected as the target camera to "activated" and sets the state of the cameras 110 not selected as the target camera to "deactivated," in the monitoring space information stored in the monitoring space DB unit 336.

The selecting unit 338 instructs the information acquiring unit 334 to switch the destination of the moving body information to the tracking target designating unit 135 and the comparing unit 339.

The selecting unit 338 sets an activation period during which the selection of target cameras is activated (step S46). In this way, an activation period during which the selection of target camera is activated is also set for the moving body detection process and the feature extraction process in the moving body detecting device 120 connected to the camera 110 selected as the target camera.

The selecting unit 338 then determines whether or not the activation period has ended (step S47). If the activation period has ended (Yes in step S47), the process returns to step S45, and the selecting unit 338 cancels the selection of the camera 110 selected as the target camera and selects another camera 110 as the target camera. If the activation period has not ended (No in step S47), the process proceeds to step S48.

In step S48, the detecting/extracting unit 123 of the moving body detecting device 120 connected to the camera 110 selected as the target camera determines whether or not a moving body has been detected in the image captured by the camera 110 selected as the target camera. If a moving body is detected (Yes in step S48), the process proceeds to step S49; if no moving body is detected (No in step S48), the process returns to step S47.

In step S49, the detecting/extracting unit 123 extracts the features of the detected moving body from the corresponding image, generates moving body information indicating the detected moving body, the extracted features, and the camera identification information of the corresponding camera 110, and sends it to the moving body tracking device 330 via the transmitting/receiving unit 122. The information acquiring unit 334 that has acquired such moving body information via the network communication unit 131 gives the moving body information to the tracking target designating unit 135 and the comparing unit 339.

The comparing unit 339 compares the features indicated by the received moving body information with the features indicated by the existing moving body information stored in the monitoring space DB unit 336, to determine whether or not the moving body indicated by the moving body information is identical to the existing moving body, which is the moving body indicated by the existing moving body information (step S50). If it is determined that these are identical (Yes in step 350), the process returns to step S47, and if it is determined that these are not identical (No in step S50), the process proceeds to step S51.

In step S51, the comparing unit 339 compares the features indicated by the received moving body information with the features of the tracking target moving body, to determine whether or not the moving body indicated by the moving body information and the tracking target moving body are identical.

If it is determined that these are identical (Yes in Step S51), the tracking managing unit 140 registers the position of the identified moving body and the date and time the corresponding image was captured to the moving body tracking information stored in the monitoring space DB unit 136, and the process returns to step S13 in FIG. 8.

If it is determined that these are not identical (No in step S51), the process returns to step S47.

As described above, in the second embodiment, the activation period of the moving body detection process and the feature extraction process for each destination floor candidate is set on the basis of elevator stop floor information and the arrival time, and the tracking process of the tracking target moving body is performed; however, in the third embodiment, information on the moving bodies already present on each destination floor candidate is preliminarily acquired and managed, to improve the identification of the tracking target moving body and tracking accuracy.

In this way, it is possible to exclude the moving bodies present on the stop floor before the arrival of the elevator from those to be possibly identified as the tracking target moving body, and erroneous identification and erroneous tracking can be suppressed.

If the existing moving bodies include a moving body having features similar to the features of the tracking target moving body, it is possible to execute control to preliminarily change the features to be used for identification from those used in normal times, for example, to change the features to be used for determination to more detailed features or to change the threshold setting of the identification.

Fourth Embodiment

Figure 10:
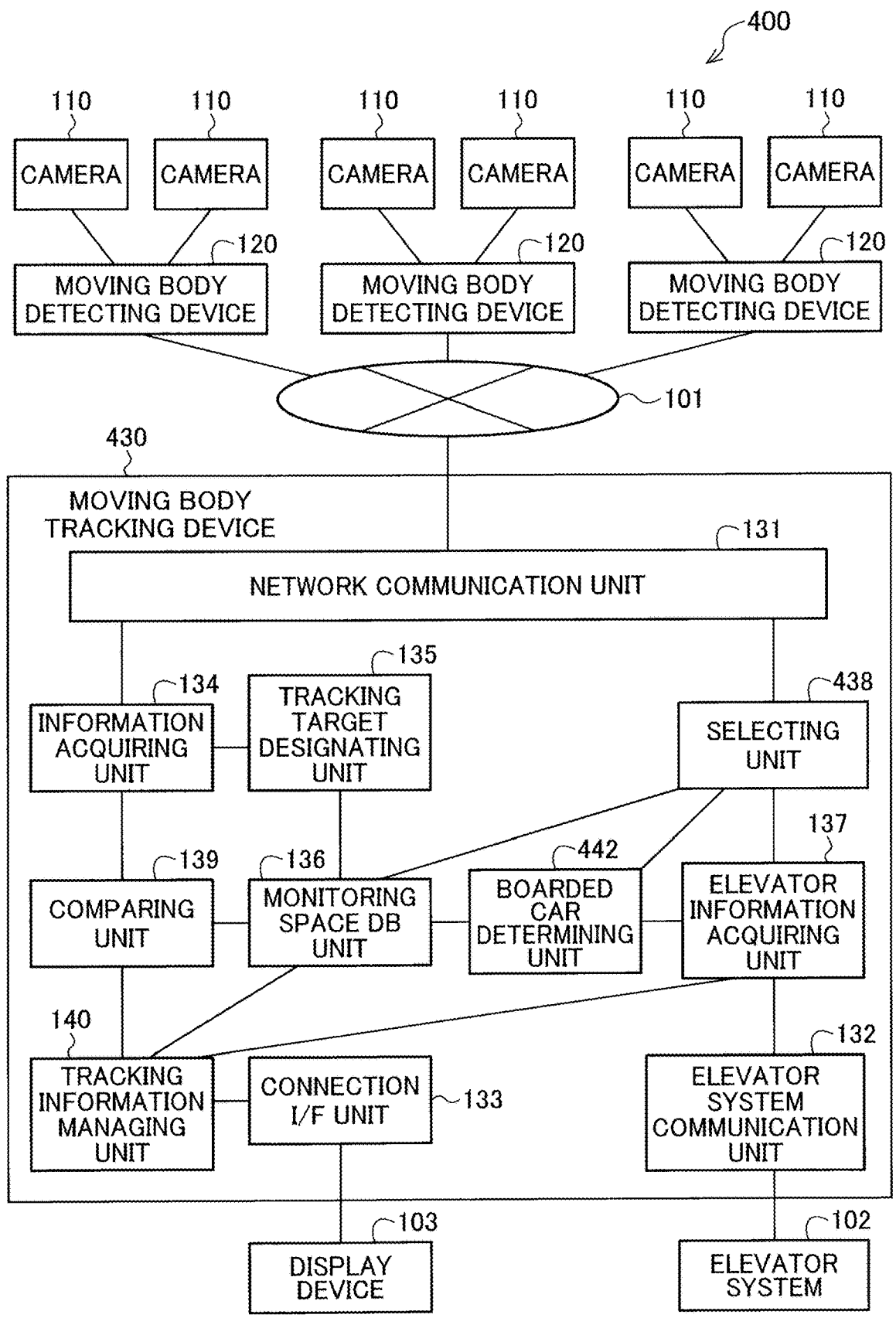
FIG. 10 is a block diagram schematically illustrating the configuration of a moving body tracking system according to a fourth embodiment.

FIG. 10 is a block diagram schematically illustrating the configuration of a moving body tracking system 400 according to the fourth embodiment.

As illustrated in FIG. 10, the moving body tracking system 400 according to the fourth embodiment includes multiple cameras 110, moving body detecting devices 120, and a moving body tracking device 430.

The cameras 110 and the moving body detecting devices 120 of the moving body tracking system 400 according to the fourth embodiment are respectively the same as the cameras 110 and the moving body detecting devices 120 of the moving body tracking system 100 according to the first embodiment.

As illustrated in FIG. 10 the moving body tracking device 430 includes a network communication unit 131, an elevator system communication unit 132, a connection interface unit (connection I/F unit) 133, an information acquiring unit 134, a tracking target designating unit 135, a monitoring space database unit (monitoring space DB unit) 136, an elevator information acquiring unit 137, a selecting unit 438, a comparing unit 139, a tracking managing unit 140, and a boarded car determining unit 442.

Each component of the moving body tracking device 430 can be provided as an individual device.

The network communication unit 131, the elevator system communication unit 132, the connection I/F unit 133, the information acquiring unit 134, the tracking target designating unit 135, the monitoring space DB unit 136, the elevator information acquiring unit 137, the comparing unit 139, and the tracking managing unit 140 of the moving body tracking device 430 according to the fourth embodiment are respectively the same as the network communication unit 131, the elevator system communication unit 132, the connection I/F unit 133, the information acquiring unit 134, the tracking target designating unit 135, the monitoring space DB unit 136, the elevator information acquiring unit 137, the comparing unit 139, and the tracking managing unit 140 of the moving body tracking device 130 according to the first embodiment.

The boarded car determining unit 442 determines the elevator boarded by the tracking target moving body on the basis of the moving body tracking information stored in the monitoring space DB unit 136 and the elevator operation information acquired by the elevator information acquiring unit 137.

In the first embodiment, the selecting unit 138 determines that the tracking target moving body has boarded the elevator by analyzing an image captured in an area such as an elevator hall where the elevator is installed or by the fact that the tracking target moving body is no longer detected while satisfying a predetermined condition. The selecting unit 138 then, for example, narrows down the floors that are destination candidates on the basis of stop floor information of the elevator or the like to improve the identification of the moving bodies and the tracking accuracy.

When multiple elevators are installed, in particular, when multiple elevators are installed side by side, the stop floors of the multiple elevator cars are adopted as the destination candidates in the determination according to the first embodiment, and the number of destination candidates becomes large.

In the fourth embodiment, the boarded car determining unit 442 determines which elevator car the tracking target moving body has boarded at the time of boarding determination of the elevator. The selecting unit 438 then selects the target camera by using only the operation status of the elevator car determined as to be the one boarded by the tracking target moving body. In this way, the cameras 110 of the stop floors of the elevator cars not boarded by the tracking target moving body are prevented from being selected as target cameras that detect moving bodies and capture images for extracting their features; thereby, the identification and tracking accuracy can be improved, and unwanted execution of arithmetic processing can be prevented.

For example, the boarded car determining unit 442 may determine that the elevator car in the moving direction of the tracking target moving body is the elevator car boarded by the tracking target moving body on the basis of an image captured by the camera 110 installed in an area such as an elevator hall where the elevator is installed. In such a case, it may be difficult to determine which elevator car was boarded depending on the angle and/or the image capture range of the camera 110.

Thus, the boarded car determining unit 442 can use the elevator operation information and determine, to be the boarded car, the elevator car having an open door on the floor on which the tracking target moving body boarded the elevator at the time when it is determined that the tracking target moving body has boarded the elevator. In this way, the elevator cars that could not possibly have been boarded can be excluded from the targets.

Since the object is to select a destination candidate for when the tracking target moving body moves between floors, the boarded car determining unit 442 may determine, to be a target elevator car, an elevator car that started moving after door closing, i.e., an elevator car that moved to another floor as the determination condition. In this way, the target camera can be appropriately selected even when the tracking target moving body stays in the elevator for a predetermined time.

As described above, in the fourth embodiment, when multiple elevators are installed in the monitored area, the boarded car determining unit 442 functioning as a boarded elevator specifying unit specifies the elevator boarded by the tracking target moving body out of the multiple elevators as the boarded elevator. The selecting unit 438 then refers to the elevator operation information to select the target camera on the basis of the operation status of the boarded elevator.

The boarded car determining unit 442 may refer to the elevator operation information to specify, as the boarded elevator, the elevator that has an open door at the time when the tracking target moving body boards the elevator out of the multiple elevators, or may refer to the elevator operation information to specify, as the boarded elevator, the elevator that has an open door at the time when the tracking target moving body boards the elevator and that starts moving after the tracking target moving body boarded out of the multiple elevators.

The moving body tracking device 430 described above can also be implemented by, for example, the computer 160, as illustrated in FIG. 4A.

For example, the selecting unit 438 and the boarded car determining unit 442 can also be implemented by the processor 166 loading the programs stored in the storage device 164 to the memory 165 and executing these programs.

Each component of the moving body tracking device 330 illustrated in FIG. 10 can be provided as an individual device.

In such a case, for example, a portion or the entirety of the selecting unit 438 and the boarded car determining unit 442 can be implemented by, for example, a processing circuit 167, such as a single circuit, a composite circuit, a processor running on a program, a parallel processor running on a program, an ASIC, or an FPGA, as illustrated in FIG. 4B.

In other words, the information acquiring unit 134, the tracking target designating unit 135, the elevator information acquiring unit 137, the selecting unit 438, the comparing unit 139, the tracking managing unit 140, and the boarded car determining unit 442 can be implemented by processing circuitry.

With the configuration described above, even when there are multiple elevators, it is possible to prevent erroneous detection and unwanted execution of computational processing due to the activation of the moving body detection process and the feature extraction process of the cameras 110 at unnecessary destination candidates.

DESCRIPTION OF REFERENCE CHARACTERS 100, 200, 300, 400 moving body tracking system; 110 camera; 120 moving body detecting device; 121 receiving unit; 122 transmitting/receiving unit; 123 detecting/extracting unit; 124 control unit; 130, 230, 330, 430 moving body tracking device; 131 network communication unit; 132 elevator system communication unit; 133 connection I/F unit; 134, 334 information acquiring unit; 135 tracking target designating unit; 136, 336 monitoring space DB unit; 137 elevator information acquiring unit; 138, 238, 338, 438 selecting unit; 139, 339 comparing unit; 140 tracking managing unit; 341 existing moving body managing unit; 442 boarded car determining unit.

What is claimed is:

1. A moving body tracking system configured to track movement of a tracking target moving body in a monitored area in which a plurality of moving bodies move, the tracking target moving body being a target of tracking, the system comprising:
   processing circuitry
      to acquire elevator operation information indicating an operation status of an elevator installed in the monitored area from an elevator system controlling operation of the elevator;
      to refer to the elevator operation information to specify a floor on which the tracking target moving body is likely to unboard as a target floor;
      to select at least one camera disposed on the target floor out of a plurality of cameras disposed in the monitored area as a target camera;
      to detect a moving body in an image captured by the target camera and extract a feature of the detected moving body; and
      to compare a target feature and a feature of the tracking target moving body to identify the tracking target moving body in the plurality of moving bodies, the target feature being the extracted feature.

2. The moving body tracking system according to claim 1, wherein the processing circuitry specifies a stop floor of the elevator as the target floor.

3. The moving body tracking system according to claim 1, wherein the processing circuitry specifies, as the target floor, a floor selected through call registration or destination floor registration as a stop floor during a specific period after the tracking target moving body boards the elevator.

4. The moving body tracking system according to claim 1, wherein when an activation period for selection of the target camera is set and the tracking target moving body is not identified during the activation period, the processing circuitry cancels the selection of the target camera and selects, from the plurality of cameras, at least one camera not selected as the target camera as at least one new target camera.

5. The moving body tracking system according to claim 4, wherein the processing circuitry sets a predetermined period after the elevator stops as the activation period for the target camera disposed on the floor on which the elevator stopped.

6. The moving body tracking system according to claim 4, wherein the processing circuitry sets a predetermined period after the elevator stops and a door of the elevator opens as the activation period for the target camera disposed on the floor on which the elevator stopped.

7. The moving body tracking system according to claim 6, wherein the predetermined period is a period until the door of the elevator closes.

8. The moving body tracking system according to claim 6, wherein the predetermined period is a period until a predetermined additional period elapses after the door of the elevator closes.

9. The moving body tracking system according to claim 1, wherein, the processing circuitry sets a preparatory period which is a predetermined period after the tracking target moving body boards the elevator, detects an existing moving body in a preparatory image and extracts a preparatory feature from the preparatory image during the preparatory period, the existing moving body being a moving body detected in the preparatory image, the preparatory image being an image captured by the target camera, the preparatory feature being a feature of the existing moving body, and when the processing circuitry determines that the target feature does not coincide with the preparatory feature after the tracking target moving body boards the elevator, the processing circuitry compares the target feature with a feature of the tracking target moving body to identify the tracking target moving body in the plurality of moving bodies.

10. The moving body tracking system according to claim 9, wherein the preparatory period is a period until the elevator stops on the target floor.

11. The moving body tracking system according to claim 9, wherein the preparatory period is a period until the elevator stops on the target floor and the door opens.

12. The moving body tracking system according to claim 1, wherein,
a plurality of the elevators is disposed in the monitored area,
the processing circuitry specifies an elevator boarded by the tracking target moving body as a boarded elevator out of the plurality of elevators, and
the processing circuitry refers to the elevator operation information to select the target camera based on an operation status of the boarded elevator.

13. The moving body tracking system according to claim 12, wherein the processing circuitry refers to the elevator operation information to specify the boarded elevator as the elevator whose door is open when the tracking target moving body boards the elevator out of the plurality of elevators.

14. The moving body tracking system according to claim 12, wherein the processing circuitry refers to the elevator operation information to specify the boarded elevator as the elevator whose door is open when the tracking target moving body boards the elevator out of the plurality of elevators and starts moving after boarded by the tracking target moving body.

15. The moving body tracking system according to claim 1, wherein the processing circuitry further tracks the movement of the tracking target moving body in the monitored area based on a position of the target camera and a time at which the image including the moving body identified to be the tracking target moving body is captured.

16. A moving body tracking device configured to track movement of a tracking target moving body in a monitored area in which a plurality of moving bodies move, the tracking target moving body being a target to be tracked, the device comprising:
processing circuitry
to acquire elevator operation information indicating an operation status of an elevator installed in the monitored area from an elevator system controlling operation of the elevator;
to refer to the elevator operation information to specify a floor on which the tracking target moving body is likely to unboard as a target floor;
to select at least one camera disposed on the target floor out of the plurality of cameras disposed in the monitored area as a target camera; and
to compare a target feature extracted as a feature of a moving body detected in an image captured by the target camera with a feature of the tracking target moving body, to identify the tracking target moving body in the plurality of moving bodies.

17. A non-transitory computer-readable medium that stores therein a program that causes a computer to function as a moving body tracking device to track movement of a tracking target moving body in a monitored area in which a plurality of moving bodies move, the tracking target moving body being a target to be tracked, the computer executing processes of:
acquiring elevator operation information indicating an operation status of an elevator installed in the monitored area from an elevator system controlling operation of the elevator;
referring to the elevator operation information to specify a floor on which the tracking target moving body is likely to unboard as a target floor;
selecting at least one camera disposed on the target floor out of a plurality of cameras disposed in the monitored area as a target camera; and
comparing a target feature extracted as a feature of a moving body detected in an image captured by the target camera with a feature of the tracking target moving body, to identify the tracking target moving body in the plurality of moving bodies.

18. A moving body tracking method for tracking movement of a tracking target moving body in a monitored area in which a plurality of moving bodies move, the tracking target moving body being a target to be tracked, the method comprising:
acquiring elevator operation information indicating an operation status of an elevator installed in the monitored area from an elevator system controlling operation of the elevator;
referring to the elevator operation information to specify a floor on which the tracking target moving body is likely to unboard as a target floor;
selecting at least one camera disposed on the target floor out of a plurality of cameras disposed in the monitored area as a target camera;
detecting a moving body in an image captured by the target camera;
extracting a feature of the detected moving body; and
comparing a target feature and a feature of the tracking target moving body to identify the tracking target moving body in the plurality of moving bodies, the target feature being the extracted feature.

19. A moving body tracking system configured to track movement of a tracking target moving body in a monitored area in which a plurality of moving bodies move, the tracking target moving body being a target of tracking, the system comprising:
processing circuitry
to acquire elevator operation information indicating an operation status of an elevator installed in the monitored area from an elevator system controlling operation of the elevator;
to refer to the elevator operation information to specify a floor on which the tracking target moving body is likely to unboard as a target floor;
to select at least one camera disposed on the target floor out of a plurality of cameras disposed in the monitored area as a target camera;

to activate detection of a moving body in an image captured by the target camera and extract a feature of the detected moving body; and to compare a target feature and a feature of the tracking target moving body to identify the tracking target moving body in the plurality of moving bodies, the target feature being the extracted feature.

\* \* \* \* \*